United States Patent
Thomas

(10) Patent No.: US 9,446,572 B2
(45) Date of Patent: Sep. 20, 2016

(54) COMPOSITE TOOL HAVING VACUUM INTEGRITY

(71) Applicant: The Boeing Company, Chicago, IL (US)

(72) Inventor: Charles William Thomas, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 372 days.

(21) Appl. No.: 13/665,048

(22) Filed: Oct. 31, 2012

(65) Prior Publication Data

US 2014/0116610 A1 May 1, 2014

(51) Int. Cl.
*B32B 37/10* (2006.01)
*B29C 70/44* (2006.01)

(52) U.S. Cl.
CPC ............... *B32B 37/10* (2013.01); *B29C 70/44* (2013.01); *B32B 37/1009* (2013.01); *B32B 37/1018* (2013.01); *Y10T 156/10* (2015.01); *Y10T 156/1052* (2015.01)

(58) Field of Classification Search
CPC .............. B32B 37/10; B32B 37/1009; B32B 37/1018; B29C 70/44
USPC .......................................... 156/285, 286, 94
See application file for complete search history.

(56) References Cited

U.S. PATENT DOCUMENTS

| 5,716,488 | A | * | 2/1998 | Bryant .......................... 156/382 |
| 6,796,784 | B1 | | 9/2004 | Andre |
| 8,105,068 | B2 | | 1/2012 | Ross et al. |
| 8,215,154 | B2 | | 7/2012 | Toledo Garcia |
| 2004/0070108 | A1 | * | 4/2004 | Simpson et al. ............... 264/236 |
| 2009/0165931 | A1 | * | 7/2009 | Callis ............................ 156/153 |
| 2010/0096779 | A1 | | 4/2010 | Corden et al. |
| 2010/0170326 | A1 | | 7/2010 | Miller et al. |

FOREIGN PATENT DOCUMENTS

WO       2005070642 A1       8/2005

OTHER PUBLICATIONS

PCT Search Report and Written Opinion, dated Jan. 2, 2014, regarding Application No. PCT/US2013/060527, 11 pages.
International Preliminary Report on Patentability, dated May 5, 2015, regarding Application No. PCT/US2013/060527, 7 pages.

* cited by examiner

*Primary Examiner* — Christopher Schatz
(74) *Attorney, Agent, or Firm* — Yee & Associates, P.C.

(57) ABSTRACT

A composite tool for vacuum bag processing composite parts comprises a plurality of laminated composite plies, including a facesheet adapted to have a composite part placed thereon. A gas impermeable barrier layer sandwiched between the composite plies prevents air leaks through the tool.

8 Claims, 3 Drawing Sheets

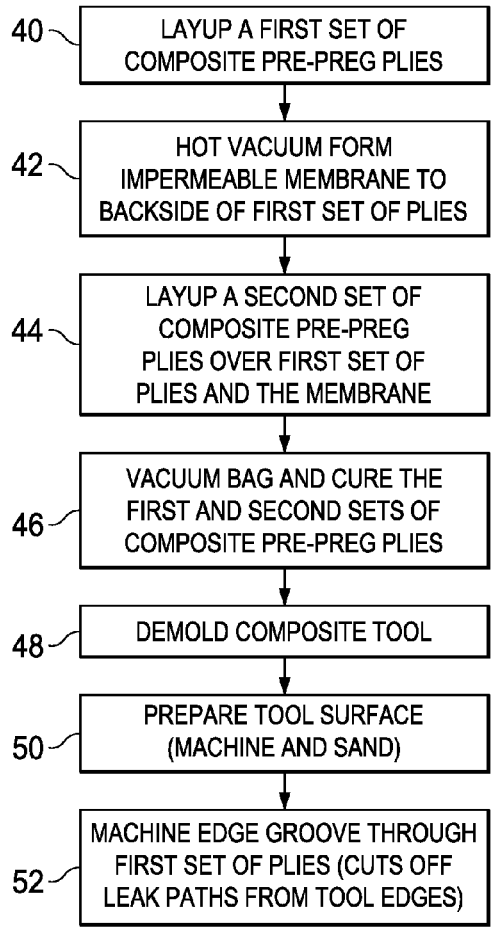
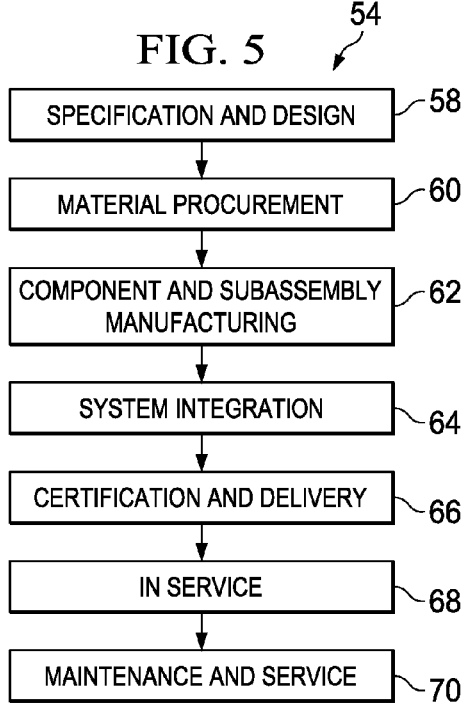
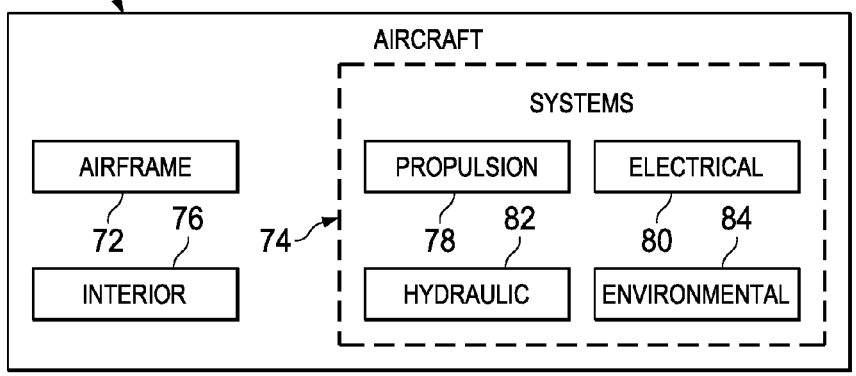

COMPOSITE TOOL HAVING VACUUM INTEGRITY

BACKGROUND INFORMATION

1. Field

The present disclosure broadly relates to tools used to vacuum bag process composite parts, and deals more particularly with a composite tool having vacuum integrity.

2. Background

Vacuum bag processing is commonly used in the fabrication of composite parts to consolidate and/or cure a part layup comprising a multi-ply pre-preg. The part layup is placed on a tool and a vacuum bag is installed over the layup and sealed to the tool. The vacuum bag is evacuated in order to compress the layup against the tool and thereby consolidate and/or form the layup. Any leaks that may occur which allow a loss of vacuum bag pressure may affect the quality and/or performance of the finished part.

Composite tools are sometimes used for vacuum bag processing because of their relatively low cost to manufacture and light weight. However these composite tools may sometimes experience through-the-tool leaks which occur at the time of manufacture, or during service due to thermal cycling or impact damage caused by handling. Because of these problems, composite tools may be tested for air leak prior to use. When through-the-tool leaks are detected, the composite tool may be repaired, however such repairs are not always reliable, and some cases, if not performed properly, the repair itself may result in a leak. In some cases, leakages in composite tools may be temporarily repaired by placing a thermoplastic or similar tape over the facesheet of the tool, covering the area of the leak. However this type of repair may not be durable, and may affect the dimensional accuracy of the cured part.

Accordingly, there is a need for a composite tool used in vacuum bag processing of composite parts that reduces or eliminates through-the-tool leaks, and which is both durable and reliable. There is also a need for a method of fabricating a composite tool with the vacuum integrity of the type mentioned above.

SUMMARY

The disclosed embodiments provide a composite tool with vacuum integrity that may be used to perform vacuum bag processing of composite pre-preg part layups. The composite tool comprises a multi-ply composite laminate that includes an integral barrier layer such as a membrane, that is impervious to air in order to prevent through-the-tool leaks and maintain a vacuum seal, even when cracks occur in the tool. Elimination of through-the-tool leaks may reduce undesired inconsistencies in cured parts and improve the strength and/or integrity of the parts. Reliable vacuum integrity of the composite tool may reduce or eliminate scrapped parts, resulting in corresponding reductions in material and labor costs. The composite tool is durable and may withstand repeated thermal cycling during part processing without air leakage.

According to one disclosed embodiment, a composite tool is provided having vacuum integrity. The composite tool comprises a composite laminate including a barrier layer of material impermeable to air. The composite laminate includes first and second sets of composite plies, wherein the barrier layer includes a membrane sandwiched between the first and second sets of composite plies. The membrane may be flexible, and may be formed of one of rubber, nylon and silicone. The composite laminate may include a facesheet having a tool surface adapted to have a composite part placed thereon, and an edge breather groove in the facesheet extending down to the barrier layer and surrounding the tool surface.

According to another embodiment, a composite tool is provided for use in vacuum bag processing composite parts. The composite tool comprises a plurality of composite plies, including a facesheet having a tool surface adapted to have a composite part placed thereon, and at least one gas impermeable barrier layer interposed between the composite plies for preventing air leaks through the tool. The barrier layer is formed of a flexible material, and may be one of a rubber, nylon and silicone. The composite plies include a groove substantially surrounding the tool surface. The groove extends through the facesheet down into at least some of the plies to the barrier layer.

According to a further embodiment, a method is provided of fabricating a composite tool used for vacuum bag processing composite parts. The method comprises forming a first composite tool portion, forming a second composite tool portion having a tool surface upon which a composite part may be placed for vacuum bag processing, and placing an air impermeable membrane between the first and second composite tool portions to prevent air leaks through the tool. Placing an air impermeable membrane between the first and second composite tool portions may include placing the air impermeable membrane on a surface of the first composite tool portion, adhering the air impermeable membrane to the surface of the first composite tool portion by placing a vacuum bag over the air impermeable membrane and the first composite tool portion, and using the vacuum bag to compress the air impermeable membrane against the surface of the first composite tool portion. Forming the first composite tool portion includes laying up a first set of composite pre-preg plies, and placing the membrane includes laying up the membrane on the first set of composite pre-preg plies. Forming the second composite tool portion includes laying up a second set of composite pre-preg plies over the membrane. The method may further comprise forming a groove in the second composite tool portion surrounding the area on which the composite part may be placed. Forming the groove in the second composite tool portion is performed by machining the second set of composite pre-preg plies down to the level of the membrane.

According to still another embodiment, a method is provided of fabricating a composite tool having vacuum integrity. The method comprises laying up a first set of composite pre-preg plies, laying up a second set of composite pre-preg plies, placing an air impermeable membrane between the first and second sets of composite pre-preg plies to prevent through-the-tool leaks, and laminating the first and second sets of composite pre-preg plies and the impermeable membrane. The laminating includes co-curing the first and second sets of composite pre-preg plies and vulcanizing the impermeable membrane. The method further comprises curing each of the first and second sets of pre-preg plies, wherein the laminating includes adhesively bonding the impermeable membrane to each of the cured first and second sets of composite pre-preg plies. The method may also include forming a groove in a face of the second set of composite pre-preg plies surrounding an area of the tool on which a composite layup may be placed for vacuum bag processing. Placing the air impermeable membrane includes placing a sheet of b-staged rubber on a ply forming part of the second set of composite pre-preg plies, and the laminating includes vulcanizing the sheet of b-staged rubber.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 4 is an illustration of a flow diagram showing the steps of another embodiment of a method of making the composite tool shown in FIGS. 1 and 2.

FIG. 5 is an illustration of a flow diagram of aircraft production and service methodology.

FIG. 6 is an illustration of a block diagram of an aircraft.

DETAILED DESCRIPTION

Figure 1:
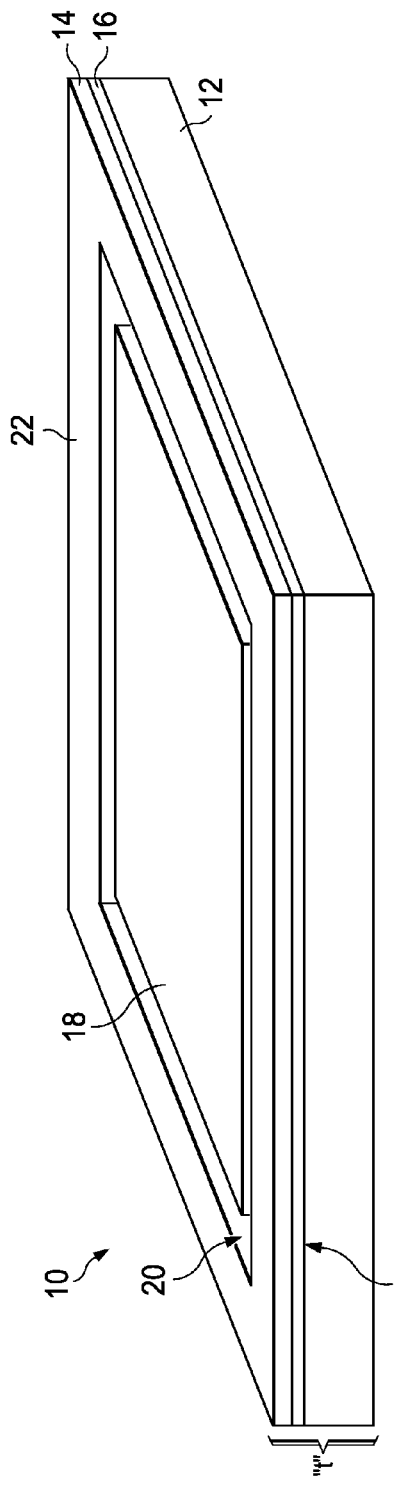
FIG. 1 is an illustration of a perspective view of a composite tool having vacuum integrity according to the disclosed embodiments.

Referring first to FIG. 1, the disclosed embodiments relate to a composite tool 10 having vacuum integrity which may be employed to process parts using vacuum bagging techniques. For example, the composite tool 10 may be used to consolidate, form and/or cure a composite pre-preg part layup (not shown in FIG. 1), either with or without autoclave processing. As will be discussed below in more detail, the construction of the composite tool 10 reduces or eliminates through-the-tool air leaks which may result in a reduction of vacuum during vacuum bag processing of the part layup, and affect the quality of the finished part.

The composite tool 10 comprises a composite laminate that includes a barrier layer 16 of a material that is impermeable to the passage of gas therethrough, including air. The barrier layer 16 may comprise a suitable impermeable membrane 25, discussed in more detail below, which is sandwiched between, and laminated with a first tool portion 12 and a second tool portion 14. Each of the first and second tool portions 12, 14 respectively may be formed of a multi-ply, fiber reinforced laminate such as, without limitation, carbon fiber epoxy plastic (CFRP). The composite tool 10 includes a peripherally extending, edge breather groove 20 in the top thereof surrounding a part supporting tool surface 18, and an outer peripheral shoulder 22 to which a vacuum bag (not shown) may be sealed.

Figure 2:
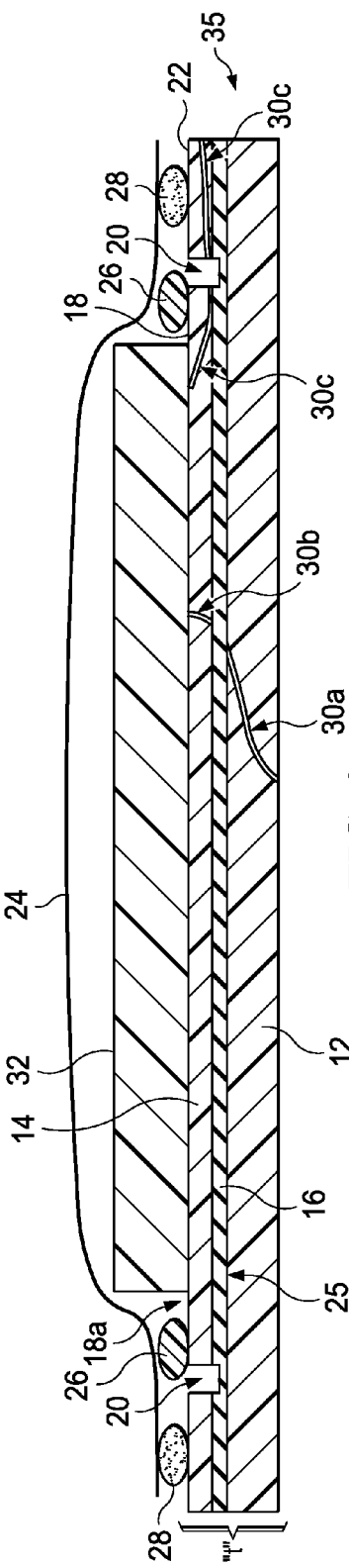
FIG. 2 is an illustration of a cross-sectional view of the tool shown in FIG. 1, a composite part layup having been placed on the tool, the vacuum bag shown just before evacuation.

Attention is now directed to FIG. 2 which illustrates additional details of the composite tool 10. In the illustrated example, a composite part layup 32 has been placed on the tool surface 18 in preparation for vacuum bag processing. A flexible vacuum bag 24 is installed over the part layup 32 and sealed around its periphery to the peripheral shoulder 22 by means of a conventional sealant 28. Although not shown in FIG. 2, the vacuum bag 24 is coupled with a suitable vacuum source for evacuating and drawing the bag 24 down against the part layup 32, thereby compacting the part layup 32 against the tool surface 18. Other components normally used in vacuum bag processing may be placed on top of the part layup 32, beneath the vacuum bag 24, including but not limited to peel plies, surface breathers, caul plates, etc. (all not shown). An edge breather 26 may be placed around the outer periphery of the part layup 32, beneath the vacuum bag 24, supported on the outer edges of the tool surface 18. Although not shown in the Figures, the edge breather groove 20 is coupled with a relatively high flow vacuum line connected to a vacuum pump which evacuates the edge breather groove 20 as the vacuum bag 24 is being evacuated and drawn down against the part layup 32. As the vacuum bag 24 is being drawn down during evacuation, it bridges across the top of the edge breather groove 20, thereby allowing the edge breather groove 20 to remain substantially open. The edge breather groove 20 functions as a vacuum manifold which applies good vacuum pressure around the entire perimeter of the part layup 32 while permitting the edges of the tool surface 18 to "breathe".

The impermeable membrane 25 forming the barrier layer 16 may comprise any suitable material that is flexible and prevents the passage of gas such as air therethrough and which may be laminated to plies of the first and second tool portions 12, 14 respectively. The membrane 25 forming the barrier layer 16 may comprise, for example and without limitation, an elastomeric rubber such as Viton®, a flexible nylon or a flexible silicone. As will be discussed below, in some embodiments, the membrane 25 forming the barrier layer 16 may comprise a sheet of material that is hot vacuum formed onto a face of first tool portion 12 during fabrication of the composite tool 10. In applications where the membrane 25 is an elastomeric rubber, the rubber may be in a b-stage when hot vacuum formed onto the first tool portion 12 and is later vulcanized.

Other techniques for adhering the membrane 25 to the face of the first tool portion 12 possible, including but not limited to adhesive bonding. The thickness of the barrier layer 16, as well as its position within in the thickness "t" of the composite tool 10 may vary depending upon the application, as well as the particular materials used to form the composite tool 10. Generally, however, the barrier layer 16 may be positioned within the upper half of the thickness "t" of the composite tool 10, but at least several plies beneath the top ply or facesheet 18a of the second tool portion 14. It should be noted here that while a membrane 25 has been illustrated, the impermeable barrier layer 16 may be formed using other techniques.

As a result of thermal cycling, wear and tear, handling, impacts or other causes, leak paths may develop through at least a portion of the thickness "t" of the composite tool 10. The membrane 25 functions as a barrier layer 16 that prevents air entering these leak paths from reaching the part layup 32 and/or the volume within the vacuum bag 24, thereby maintaining vacuum seal. For example, 30a indicates a leak path in the first tool portion 12 that propagates upwardly but is arrested and blocked by the barrier layer 16. Similarly, a leak path 30b extending from the facesheet 18a downwardly through the second tool portion 14 is also blocked and sealed-off by the barrier layer 16. 30c indicates another possible leak path that extends from the tool surface 18 downwardly and laterally outward to an edge 35 of the second tool portion 14. The edge breather groove 20 cuts off the leak path 30c, thereby preventing leakage of air into the vacuum bag 24 from the edge 35. Thus, any air entering leak paths formed in the composite tool 10 is prevented from reaching the part layup 32 or the volume within the vacuum bag 24, which might otherwise cause a loss of vacuum pressure and/or inconsistencies in the cured part.

Figure 2A:
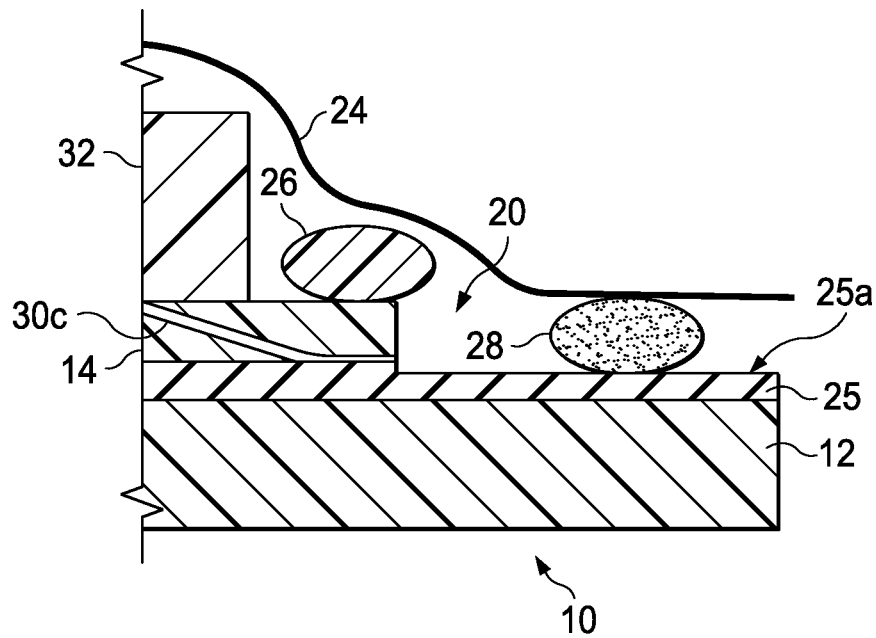
FIG. 2A is an illustration of a cross-sectional view of an edge of the tool shown in FIG. 2, showing an alternate form of the edge breather groove.

FIG. 2A illustrates an alternate embodiment of the composite tool 10 in which the edge breather groove 20 extends laterally outward to the edge 35 (FIG. 2) of the second tool portion 14, eliminating the peripheral shoulder 22. In this embodiment, the vacuum bag 24 is sealed directly against exposed outer edges 25a of the membrane 25 by the sealant 28. Where the sealant 28 directly contacts the membrane 25, as in this example, the membrane 25 should be formed of a material that is not only impermeable, but is also compatible with the sealant 28, durable, and resistant to solvents conventionally used in the fabrication of composites.

Figure 3:
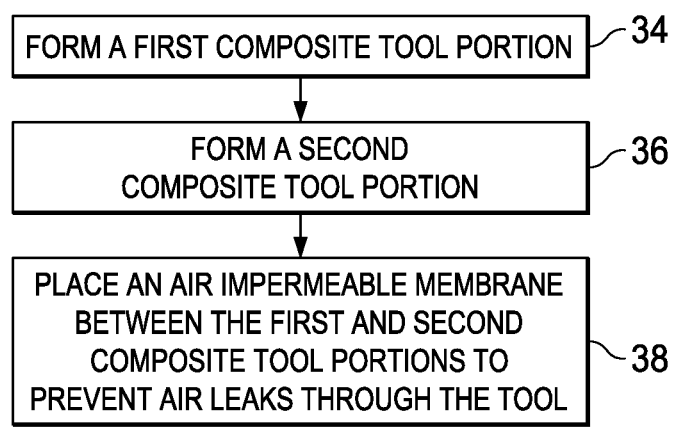
FIG. 3 is an illustration of a flow diagram broadly showing the steps of one embodiment of a method of making the composite tool shown in FIGS. 1 and 2.

FIG. 3 illustrates one embodiment of a method of making the composite tool 10 shown in FIGS. 1 and 2. Beginning at step 34, a first composite tool portion 12 is formed. A second, separate composite tool portion 14 is formed at 36. Each of steps 34, 36 may be carried out by laying up a plurality of fiber reinforced composite plies on a suitable substrate such as a tool or other substrate. At step 38, an air impermeable membrane 25 forming a barrier layer 16 is placed between the first and second composite tool portions 12, 14 in order to prevent air leaks through the tool 10. Various techniques can be used to place the barrier layer 16 between the first and second composite tool portions 12, 14. For example, after laying up the first composite tool portion 12, an air impermeable membrane 25, which may comprise, as previously mentioned, a sheet of an elastomeric material, nylon or silicone, may be hot-vacuum formed onto the surface of the first tool portion 12 using a vacuum bag (not shown) to compress the sheet against the surface of the first tool portion 12. This hot vacuum forming process helps assure that the membrane 25 is in intimate, face-to-face contact with the first tool portion 12, while adhering it to the first tool portion 12. While FIG. 3 shows the first tool portion 34 being formed before the second tool portion 36, in typical practical embodiments, the tool 10 may be fabricated from the tool surface 18 back. Thus, the second tool portion 14 would be laid up, following which the barrier layer 16 would be laid up over the second tool portion 14. Then, the first tool portion 12 would be laid up over the barrier layer 16, following which the edge breather groove 20 would be machined in the second tool portion 14.

In one embodiment, the first composite tool portion 12 may be pre-cured before the membrane 25 is hot vacuum formed onto it, while in another embodiment, the first composite tool portion 12 may be uncured when the membrane 25 is hot vacuum formed onto it, in which case, the first composite tool portion 12 and the membrane 25 may be cured and vulcanized simultaneously. Similarly, either or both of the composite tool portions 12, 14 may be cured or uncured at the time that the impermeable membrane 25 is laminated between them. Other sequences of laying up, assembling and curing the first and second tool portions 12, 14 with the membrane 25 are possible.

FIG. 4 illustrates another embodiment of a method of making the composite tool 10. Beginning at step 40, a first set of composite pre-preg plies is laid up on a suitable surface such as a tool or other substrate. Next, at step 42, and impermeable membrane 25 is hot vacuum formed onto the backside of the first set of composite pre-preg plies. At step 44, a second set of composite pre-preg plies is laid up over the first set of plies. At step 46, the first and second sets of plies are vacuum bagged and cured. At step 48, the composite tool 10 is demolded, following which at step 50, the surface of the composite tool 10 can be suitably prepared, as by machining and sanding the surface to the desired surface finish. Finally, at step 52 the edge breather groove is machined through the first set of plies in order to cut off leak paths extending from the outer edge 35 of the composite tool 10.

Embodiments of the disclosure may find use in a variety of potential applications, particularly in the transportation industry, including for example, aerospace, marine, automotive applications and other application where autoclave curing of composite parts may be used. Thus, referring now to FIGS. 5 and 6, embodiments of the disclosure may be used in the context of an aircraft manufacturing and service method 54 as shown in FIG. 5 and an aircraft 56 as shown in FIG. 6. Aircraft applications of the disclosed embodiments may include, for example, without limitation, composite tools used to produce a variety of composite parts, including but not limited to those forming part of the airframe 72, onboard systems 74 and/or the interior 76 of the aircraft 56. During pre-production, exemplary method 54 may include specification and design 98 of the aircraft 56 and material procurement 60. During production, component and subassembly manufacturing 62 and system integration 64 of the aircraft 56 takes place. Thereafter, the aircraft 56 may go through certification and delivery 66 in order to be placed in service 68. While in service by a customer, the aircraft 56 is scheduled for routine maintenance and service 68, which may also include modification, reconfiguration, refurbishment, and so on.

Each of the processes of method 54 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 6, the aircraft 56 produced by exemplary method 54 may include an airframe 72 with a plurality of systems 74 and an interior 76. Examples of high-level systems 74 include one or more of a propulsion system 78, an electrical system 80, a hydraulic system 82, and an environmental system 84. Any number of other systems may be included. Although an aerospace example is shown, the principles of the disclosure may be applied to other industries, such as the marine and automotive industries.

Systems and methods embodied herein may be employed during any one or more of the stages of the production and service method 54. For example, components or subassemblies corresponding to production process 62 may be fabricated or manufactured in a manner similar to components or subassemblies produced while the aircraft 56 is in service. Also, one or more apparatus embodiments, method embodiments, or a combination thereof may be utilized during the production stages 62 and 64, for example, by substantially expediting assembly of or reducing the cost of an aircraft 56. Similarly, one or more of apparatus embodiments, method embodiments, or a combination thereof may be utilized while the aircraft 56 is in service, for example and without limitation, to maintenance and service 70.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite tool having vacuum integrity, comprising:
a composite laminate including a first set of cured composite plies including a first composite ply forming a facesheet having a tool surface adapted to have a composite part placed thereon, a second set of cured composite plies, a barrier layer of flexible material impermeable to air sandwiched between the first set of cured composite plies and the second set of cured composite plies, such that a first face of the barrier layer contacts a last composite ply of the first set of cured composite plies and a second face of the barrier layer contacts a first composite ply of the second set of cured composite plies, in which the first face is opposite the second face, and an edge breather groove in the facesheet extending down to the barrier layer and surrounding the tool surface.

2. The composite tool of claim 1, wherein the barrier layer includes a membrane made of elastomeric material.

3. The composite tool of claim 2, wherein the membrane is at least one of rubber, nylon or silicone.

4. The composite tool of claim 1, wherein:
the laminate includes first and second tool portions, and the barrier layer of material impermeable to air is sandwiched between the first and second tool portions.

5. A composite tool for use in vacuum bag processing composite parts, comprising:
a plurality of cured composite plies, including a first and second sets of composite plies, the first set of composite plies including a facesheet having a tool surface adapted to have a composite part placed thereon; and
at least one gas impermeable barrier layer of flexible material interposed between the first and second set of composite plies for preventing air leaks through the tool; and
an edge breather groove in the facesheet extending from the facesheet through the first set of composite plies towards the second set of composite plies and surrounding the tool surface.

6. The composite tool of claim 5, wherein the barrier layer is formed of elastomeric material.

7. The composite tool of claim 5, wherein the flexible material is at least one of rubber, nylon or silicone.

8. The composite tool of claim 1, wherein the barrier layer is a different material than the first and second sets of cured composite plies.

* * * * *